(No Model.)

C. BUCHMÜLLER.
GRASS RECEPTACLE FOR LAWN MOWERS.

No. 428,074. Patented May 20, 1890.

Witnesses
M. C. Gale
Harold T. Finlayson

Inventor
Carl Buchmüller
by Hazard & Townsend
his Attorneys

United States Patent Office.

CARL BUCHMÜLLER, OF PASADENA, CALIFORNIA.

GRASS-RECEPTACLE FOR LAWN-MOWERS.

SPECIFICATION forming part of Letters Patent No. 428,074, dated May 20, 1890.

Application filed December 24, 1889. Serial No. 334,875. (No model.)

*To all whom it may concern:*

Be it known that I, CARL BUCHMÜLLER, a citizen of the United States, residing at Pasadena, in the county of Los Angeles and State of California, have invented a new and useful Improvement in Grass-Catching Attachments for Lawn-Mowers, of which the following is a specification.

The object of my invention is to construct a simple and cheap attachment for lawn-mowers, whereby the grass will be gathered as it is cut, and whereby the operator can conveniently dump the cut grass at such place as may be desired, without inconvenience and without changing his position relative to the machine. I accomplish this object by means of the device described herein, and illustrated in the accompanying drawings.

My invention consists of the combination, with the lawn-mower, of two laterally-swinging trough-shaped baskets open at the front end, attached to and hung beneath the handle of the mower and arranged to be in their closed position, each with one side horizontal and fitted edge to edge with the horizontal side of the other basket to form the bottom of the grass-receiver, and provided with means for operating the baskets to bring them into, secure them in, and release them from their closed position.

Figure 1:
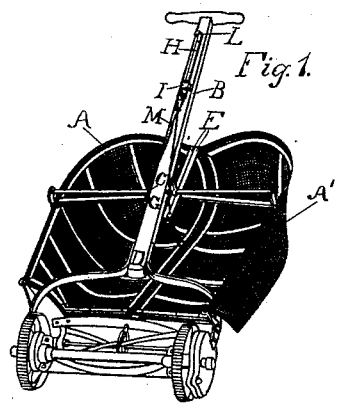
Figure 2:
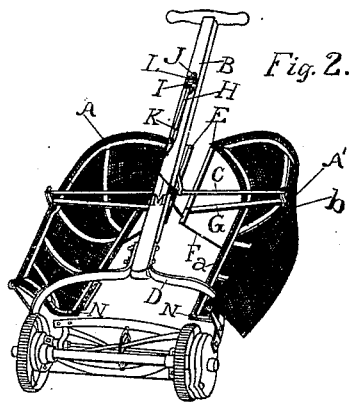
Figure 3:
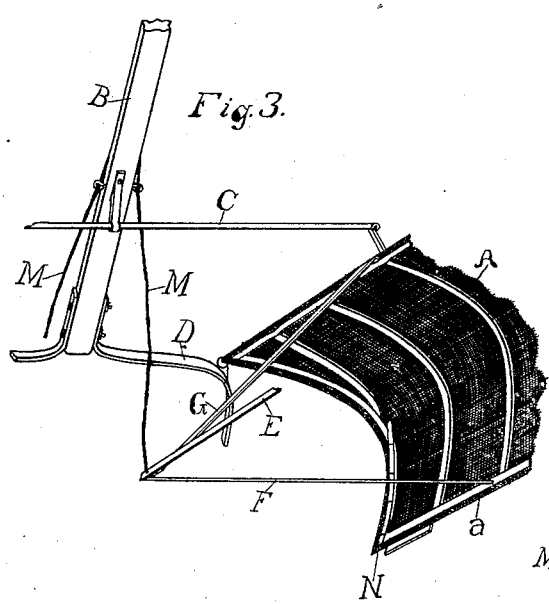
Figure 4:
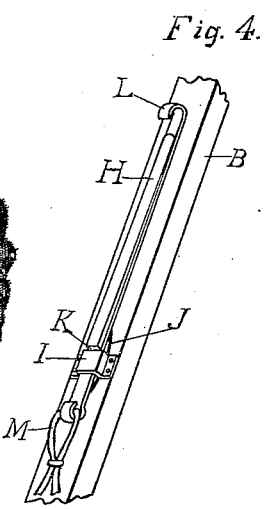

In the drawings, Figure 1 is a front perspective view of a lawn-mower provided with my attachment in its closed position, adjusted to catch the grass as it is cut. Fig. 2 is a like view showing the attachment in its open position after the latch has been operated to dump the cut grass. Fig. 3 is a rear view showing a detail of a portion of one side of my attachment in its open position to dump the grass. Fig. 4 is a detail of the latch for securing the attachment in its closed position.

A A' represent the two baskets, which, when swung into their closed position, form the receptacle for the cut grass.

B is the handle of the machine.

C is the transverse support-rod fastened to the under side of the handle. The side walls of the baskets are hinged near their middles, to their respective ends of the transverse rod and are also hinged at their front ends to the handle-brace D, so that the baskets are hinged to swing laterally to and from each other.

From the rear upper inner corner of each basket there extends forward the longitudinal brace E, to connect with the vertical brace F, secured to the inner edge a of the basket near its mid-length, and also with the transverse brace G, secured to the upper edge b of the side wall beneath the transverse rod C.

A latch-bar H is secured to the upper face of the handle O by means of the staple I, under which it plays. A spring J presses the bar H upward against the staple, and the bar is provided near its lower end with a shoulder K, which rests against the staple and holds the bar in its retracted position, except when the bar is pressed toward the handle to release the shoulder, and thus allow the bar to slide toward the front end of the handle. The hook L at the rear end of the handle prevents the handle from slipping down through the staple, and affords a handle by which the latch-bar can be drawn back into its retracted position.

Two flexible wire cords M are attached to the lower end or the bar H, and extend thence—one on each side of the handle B—to the end of its longitudinal brace E, to which it is attached, thus connecting the cords with their respective baskets. Such cords are of such length that when the bar H is retracted the brace is drawn up into position to hold the baskets in their closed position.

In order to prevent the grass from slipping forward upon the roller of the mower and thence to the ground, I attach a small rubber tube N to each of the baskets across the front end thereof.

The operation is as follows: The baskets being in their closed position, as shown in Fig. 1, the mower is pushed forward to cut the grass until the receiver is filled and a suitable place for dumping is reached. Then the latch-bar is depressed at its lower end, thus freeing shoulder K and allowing the latch-bar to slip down until hook L impinges on staple I. The baskets are thus allowed to swing outward to throw their free inner edges a apart and allow the grass to drop.

Now, having described my invention, what I claim as new, and desire to secure by Letters Patent, is—

1. The combination, with the lawn-mower, of two laterally-swinging trough-shaped baskets, open at the front end, attached to and hung beneath the handle of the mower, each with one side horizontal, and fitted edge to edge with the horizontal side of the other basket to form the bottom of the grass-receiver, and means for operating the baskets to secure them in and release them from their closed position.

2. The combination of the lawn-mower, the two laterally-swinging trough-shaped baskets, open at the front end, attached to and hung beneath the handle of the mower, the latch-bar provided with the shoulder, the staple, the spring, and the two cords connected with their respective baskets and with the latch-bar.

3. The combination of the lawn-mower, the transverse support-rod fastened to the under side of the handle, the two trough-shaped baskets, open at their front ends and hinged to the support-rod and handle-brace, and means for operating the baskets and to secure them in and release them from their closed position.

CARL BUCHMÜLLER.

Witnesses:
JAMES R. TOWNSEND,
CHARLOTTE BUCHMÜLLER.